United States Patent
Marrony et al.

(10) Patent No.: US 10,833,344 B2
(45) Date of Patent: Nov. 10, 2020

(54) PROTON-CONDUCTIVE ELECTROCHEMICAL DEVICE WITH INTEGRATED REFORMING AND ASSOCIATED PRODUCTION METHOD

(71) Applicants: ELECTRICITE DE FRANCE, Paris (FR); UNIVERSITE DE MONTPELLIER, Montpellier (FR); CENTRE NATIONAL DE LA RECHERCHE SCIENTIFIQUE-CNRS-, Paris (FR)

(72) Inventors: Mathieu Marrony, Alteckendorf Haguenau (FR); Gilles Taillades, Juvignac (FR); Jacques Roziere, Saint Martin de Londres (FR); Julian Dailly, Hagsfeld (DE)

(73) Assignees: ELECTRICITE DE FRANCE, Paris (FR); UNIVERSITE DE MONTPELLIER, Montpellier (FR); CENTRE NATIONAL DE LA RECHERCHE SCIENTIFIQUE-CNRS-, Paris (FR)

( * ) Notice: Subject to any disclaimer, the term of this patent is extended or adjusted under 35 U.S.C. 154(b) by 220 days.

(21) Appl. No.: 16/061,924

(22) PCT Filed: Dec. 16, 2016

(86) PCT No.: PCT/EP2016/081560
§ 371 (c)(1),
(2) Date: Jun. 13, 2018

(87) PCT Pub. No.: WO2017/103193
PCT Pub. Date: Jun. 22, 2017

(65) Prior Publication Data
US 2018/0375140 A1 Dec. 27, 2018

(30) Foreign Application Priority Data
Dec. 17, 2015 (FR) ...................... 15 62711

(51) Int. Cl.
*H01M 8/1041* (2016.01)
*H01M 8/1067* (2016.01)
(Continued)

(52) U.S. Cl.
CPC ............. *H01M 8/1055* (2013.01); *C25B 1/00* (2013.01); *C25B 1/04* (2013.01); *C25B 3/04* (2013.01);
(Continued)

(58) Field of Classification Search
CPC . H01M 2004/8684; H01M 2004/8689; H01M 2008/1095; H01M 2008/1293;
(Continued)

(56) References Cited

U.S. PATENT DOCUMENTS 6,004,688 A * 12/1999 Goodenough ...... H01M 8/1213
429/482
6,416,898 B1 7/2002 Ohzu et al.
(Continued)

FOREIGN PATENT DOCUMENTS

EP 2 270 914 A1 1/2011
JP 2000-285933 A 10/2000
(Continued)

OTHER PUBLICATIONS

F. Tietz. Solid Oxide Fuel Cells, Encyclopedia of Materials: Science and Technology (Second Edition) 2008, pp. 1-8.*
(Continued)

*Primary Examiner* — Carlos Barcena
(74) *Attorney, Agent, or Firm* — Faegre Drinker Biddle & Reath LLP

(57) ABSTRACT

A proton-conductive electrochemical device and method for manufacturing the device. The device comprising a positive electrode able to reduce an oxidizing species, a negative electrode able to oxidize a reducing species, and a proton-
(Continued)

conductive electrolyte, in contact with the positive and negative electrode. The device further comprises a layer able to diffuse protons and electrons, and forms a protective barrier against contaminants for the electrolyte. The layer is in contact with both the electrolyte and the negative electrode, and comprises a material of the type ABB'O$_3$ or a material of the type ABO$_3$, wherein A is an element chosen from group II of the periodic table, B is an element chosen from cerium and group IVB of the periodic table, B' is an element chosen from lanthanides or group VIIIB of the periodic table, and the layer has a porosity of less than 10% by volume.

13 Claims, 4 Drawing Sheets

(51) Int. Cl.

| | | |
|---|---|---|
| *H01M 8/1213* | (2016.01) | |
| *H01M 8/1004* | (2016.01) | |
| *H01M 4/90* | (2006.01) | |
| *H01M 4/86* | (2006.01) | |
| *C25B 3/04* | (2006.01) | |
| *C25B 1/00* | (2006.01) | |
| *C25B 9/10* | (2006.01) | |
| *C25B 1/04* | (2006.01) | |
| *H01M 8/1018* | (2016.01) | |
| *H01M 8/124* | (2016.01) | |

(52) U.S. Cl.
CPC ............ *C25B 9/10* (2013.01); *H01M 4/8621* (2013.01); *H01M 4/9025* (2013.01); *H01M 4/9075* (2013.01); *H01M 8/1004* (2013.01); *H01M 8/1067* (2013.01); *H01M 8/1213* (2013.01); *H01M 2004/8684* (2013.01); *H01M 2004/8689* (2013.01); *H01M 2008/1095* (2013.01); *H01M 2008/1293* (2013.01); *H01M 2300/0071* (2013.01); *H01M 2300/0082* (2013.01); *H01M 2300/0094* (2013.01); *Y02E 60/366* (2013.01); *Y02P 70/56* (2015.11)

(58) Field of Classification Search
CPC . H01M 2300/0071; H01M 2300/0082; H01M 2300/0094; H01M 4/8621; H01M 4/9025; H01M 4/9075; H01M 8/1004; H01M 8/1055; H01M 8/1067; H01M 8/1213
See application file for complete search history.

(56) References Cited

U.S. PATENT DOCUMENTS

| | | | |
|---|---|---|---|
| 6,558,831 B1 * | 5/2003 | Doshi | H01M 8/1231 |
| | | | 429/495 |
| 8,067,129 B2 * | 11/2011 | Couse | H01M 4/8885 |
| | | | 429/495 |
| 2002/0031695 A1 | 3/2002 | Smotkin | |
| 2004/0224216 A1 | 11/2004 | Burlatsky et al. | |
| 2006/0251950 A1 | 11/2006 | Prinz et al. | |
| 2007/0009784 A1 * | 1/2007 | Pal | H01M 4/8621 |
| | | | 429/432 |
| 2009/0169953 A1 | 7/2009 | Matsumoto et al. | |
| 2010/0255406 A1 | 10/2010 | Kang et al. | |
| 2014/0302420 A1 * | 10/2014 | Wachsman | H01M 4/9033 |
| | | | 429/489 |
| 2014/0302421 A1 | 10/2014 | Sala et al. | |

FOREIGN PATENT DOCUMENTS

| | | |
|---|---|---|
| JP | 2005-019041 A | 1/2005 |
| JP | 2005-251550 A | 9/2005 |
| JP | 2008-140613 A | 6/2008 |
| JP | 2008-171775 A | 7/2008 |
| JP | 2012-234747 A | 11/2012 |
| WO | 2005/086272 A1 | 9/2005 |
| WO | 2007/060925 A1 | 5/2009 |
| WO | 2012/036057 A1 | 3/2012 |

OTHER PUBLICATIONS

Office Action issued in related application JP 2018-531401, Jun. 24, 2019, with machine generated English language translation, 8 pages.

\* cited by examiner

PROTON-CONDUCTIVE ELECTROCHEMICAL DEVICE WITH INTEGRATED REFORMING AND ASSOCIATED PRODUCTION METHOD

CROSS-REFERENCE TO RELATED APPLICATIONS

This application is the U.S. national phase of the International Patent Application No. PCT/EP2016/081560 filed Dec. 16, 2016, which claims the benefit of French Application No. 15 62711 filed Dec. 17, 2015, the entire content of which is incorporated herein by reference.

TECHNICAL FIELD

The disclosure relates to the field of proton-conductive electrochemical devices, such as fuel cells (referred to as PEFCs, standing for "protonic electrolyte fuel cell") and more particularly proton-exchange ceramic cells, referred to as PCFCs, standing for "protonic ceramic fuel cell". The disclosure also finds an application in similar electrochemical devices such as ammonia synthesisers, electrolysers or electroreduction apparatus.

BACKGROUND

Electrochemical devices using a proton conductor may be in various forms.

Generally, these devices are used for generating an electrical voltage (use in fuel cell mode) for reducing an oxidising species and oxidising a reducing species, or to produce a reducing and oxidising species (use in electrolysing mode) via a chemical reaction through the addition of electrical energy. The reducing and oxidising species supply the device in order to ensure functioning thereof. These devices are generally composed of a porous positive electrode (cathode in the case of a fuel cell), a negative electrode that may be porous (anode in the case of a fuel cell), and a proton-conductive electrolyte disposed between the two electrodes. The process involves electrons as negative-charge carriers and protons as positive-charge carriers.

Proton-exchange fuel cells (or PEFCs) are one example of such electrochemical devices. In PEFCs, an electrical voltage and heat are generated by the oxidation of a reducing species on a negative electrode coupled with the reduction of an oxidising species on a positive electrode. In the case of hydrogen-oxygen fuel cells, the reducing and oxidising species involved in the process are hydrogen and oxygen respectively. The migration of protons generated during such a process takes place through the proton conductor. The chemical reaction consuming the reducing and oxidising species on the electrodes can be reversed in order to produce fuel through the addition of electrical energy and heat.

Fuel cells represent promising technology for replacing or supplementing other energy-production methods. These cells, which have been the subject of several improvements since their first appearance, can be classified in several categories according to several criteria, such as the operating temperature and the nature of the electrolyte.

Among them, the proton-exchange membrane fuel cell (PEMFC) generally requires the presence of liquid water for functioning, and thus operates typically at temperatures below 100° C. The proton conductor separating the two electrodes consist therein of a proton-conductive hydrated organic polymer material, the conductivity of which is related to the degree of hydration. The electrical efficiency of these cells is typically between 30% and 50% depending on the quality of the fuel at the input.

The $O^{2-}$ anion-conductive solid-oxide cell (or SOFC, standing for "solid oxide fuel cell") forms another category. The SOFC has good electrical efficiency of around 50% to 60%, and functions at temperatures typically lying between 750° C. and 1000° C. This cell comprises, between the positive electrode and the negative electrode, an $O^{2-}$ anion-conductive solid electrolyte. Because of the high temperatures used in this cell, it is generally based on the use of ceramic components, which are expensive to manufacture.

There exists, among solid-oxide cells, a particularly interesting category of cell using a proton-conductive ceramic solid electrolyte (these fuel cells are also referred to as PCFCs, standing for "protonic ceramic fuel cells"). PCFC cells function at intermediate temperatures, lying between approximately 400° C. and 700° C. These temperatures in particular allow the use of metal materials, less expensive than the ceramic materials of the SOFC fuel cells of the prior art.

The patent EP 2 270 914 proposes an example of a proton-exchange fuel cell PEFC, in particular based on ceramic of the PCFC type.

Apart from fuel cells, other proton-conductive electrochemical devices are based on a similar architecture and operating principles. The production of oxidising and reducing species may involve an electroreduction device, or use a device similar to a fuel cell as an electrolyser by reversing the oxidation-reduction reaction by the addition of electricity and heat. Other chemical reactions may involve other species such as nitrogen for synthesising ammonia for example.

Despite their strong potential, proton-conductive electrochemical devices suffer from a drawback that limits their energy efficiency. It turns out in fact that the protonic electrolyte conductor (polymer, ceramic or other solid element membrane) does not generally tolerate the presence of impurities or certain gases that form part of the composition of the fuels used for supplying the device with reducing and oxidising species. These impurities and gases constitute contaminants for the proton conductor that damage it and reduce the service life of the electrochemical device. Among the gases that are harmful for the proton conductor currently encountered in fuels are carbon dioxide $CO_2$ and hydrogen sulphide $H_2S$. These gases are generally present in compositions of the hydrocarbon type such as natural gas, alcohols or biogas for example.

To remedy this drawback, and to protect the electrochemical devices using a proton-conductive electrolyte, a step of reforming the hydrocarbon fuel upstream of the device is typically performed. Reforming the hydrocarbon fuel makes it possible to separate therefrom the harmful impurities and gases mentioned above. This so-called "external" reforming step may for example take place in vapour phase or by catalytic partial oxidation (CPDX). It may involve the use of an upstream trapping system, for example an active carbon bed or a zinc-based absorbent, or involve a filtering process with several steps. Reforming, judged necessary or even essential to preserve a proton-conductive electrochemical device such as a fuel cell, thus leads to a complex architecture involving two coupled units: reformer and electrochemical device. The use of an external reformer makes the electrochemical device less ergonomic and more expensive and also limits its overall efficiency. This is because, to produce a quantity of reducing species judged sufficient for the functioning of a protonic electrochemical device, the presence of the reformer, the efficiency of which is less than 100%, involves providing an excess of biogas in order to compensate for the losses related to the efficiency of the reformer.

A means for increasing this efficiency and simplifying the system while reducing the size and cost thereof is therefore sought.

To achieve this, one envisaged solution consists of making the negative electrode of the electrochemical device more resistant to contaminants, this electrode being exposed first to the hydrogen-based fuels. This solution provides for a negative electrode made from a catalytic material, referred to as a reforming catalyst, able to be tolerant to the residues of the reforming reaction ($H_2S$, $CO_2$, coking phenomenon). However, current catalytic materials, such as Ru in PEMFCs or Ni in SOFCs and PCFCs generally prove to be expensive to produce and give rise to limited electrical performance and a limited tolerance threshold of the device vis-à-vis residues of the internal reforming reaction.

An electrochemical device using a proton conductor of a simpler design that the current system using an external reformer situated upstream of the electrochemical device is consequently sought. A means of overcoming the drawback posed by the sensitivity of the proton-conductive electrochemical device, and in particular of its proton conductor, to the contaminants present in the fuels supplying the device is also sought.

SUMMARY

To meet the problems disclosed above, the present disclosure proposes a proton-conductive electrochemical device comprising:

a positive electrode able to reduce an oxidising species;
a negative electrode able to oxidise a reducing species;
a proton-conductive electrolyte, in contact with the porous positive electrode and with the negative electrode.

The electrochemical device further comprises a layer able to diffuse protons and electrons and forming a protective barrier to the contaminants for the proton-conductive electrolyte, said layer being in contact with the proton-conductive electrolyte on the one hand and the negative electrode on the other hand.

The disclosure as disclosed above makes it possible to integrate actually in a proton-conductive electrochemical device an element fulfilling the role of protective barrier to the contaminants for the proton-conductive electrolyte, without however having a negative effect on the functioning of the device. The disclosure thus proposes to interpose, between the negative electrode that is the origin both of the internal reforming and of the oxidation reaction of the fuel forming the electrons and the protons, and the proton-conductive electrolyte, a layer having mixed properties. The mixed properties of electrical conduction and proton conduction of this layer make it possible to guarantee selectively and preferentially exclusively a transfer without blockage of the electrons and protons involved in the functioning of the device. The compounds other than the electrons and protons forming contaminants, which are harmful for the proton conductor, are blocked by this layer. This layer thus constitutes a proton and electron filter integrated actually in the electrochemical device, without interfering with its normal functioning.

Because of the integration of this layer, between the negative electrode and the proton-conductive electrolyte, the disclosure makes it possible to dispense with a bulky system mixing an electrochemical device and an external reformer and to improve the chemical stability and therefore the overall efficiency of a proton-conductive electrochemical device using reforming catalysts at the fuel-type porous electrode.

The disclosure, by integrating this layer forming a protective barrier to the contaminants for the proton conductor, filters the harmful gaseous species such as $CO_2$ or $H_2S$, as well as the other gaseous or non-gaseous contaminants, and diffuses, selectively and preferentially exclusively, only the protons and electrons via the mixed-conduction layer. Consequently this layer protects the proton-conductive electrolyte not only against the contaminants contained in the incoming gaseous fuels used at the negative electrode, but also against any products generated at this negative electrode, other than the electrons and protons.

According to one embodiment, the layer able to diffuse protons and electrons may have a thickness of between 1 μm and 10 μm.

It has been observed that this range of thicknesses constitutes a compromise suited to the specificities of proton-conductive electrochemical devices, in particular fuel cells. This is because diffusion kinetics and impermeability vis-à-vis contaminants change differently according to the thickness of the layer with mixed properties: the proton and electron diffusion kinetics increases when the thickness of the layer decreases, while the effect of impermeability to contaminants is reinforced when the thickness of the layer increases. Moreover, adding an additional layer in an electrochemical device, in particular in the case of a fuel cell, may contribute to increasing the overall dimensions of a product consisting of an assembly of a plurality of cells. A range of thicknesses lying between 1 μm and 10 μm for this layer, and more particularly a thickness of 2 μm to 5 μm, makes it possible to obtain optimum efficiency in the electrochemical device using a proton-conductive electrolyte, without making the device bulky.

According to one embodiment, the layer able to diffuse protons and electrons may have a porosity of between 1% and 10% by volume.

It has been observed that the barrier effect to contaminants is maximum in dense layers where the porosities represent merely between 1% and 10%, more particularly between 1% and 5%, of the total volume of the layer. The low porosity proposed in the present disclosure assists the phenomenon of selectivity, allowing to pass preferentially only the protons and electrons, while blocking the passage of other compounds.

According to another embodiment, the layer able to diffuse protons and electrons may comprise material of the ABB'$O_3$ type, in which A is an element chosen from group II of the periodic table, B is an element chosen from cerium or group IVB of the periodic table, and B' is an element chosen from lanthanides or group VIIIB of the periodic table.

According to one embodiment, the layer able to diffuse protons and electrons may comprise a material of the type $ABO_3$, in which A is an element chosen from group II of the periodic table and B is an element chosen from cerium or group IVB of the periodic table.

These materials, which comprise electrolytes derived from the perovskite family, are suited to the operating temperatures typically encountered in PCFC proton-conductive ceramic fuel cells, lying between 400° C. and 700° C., and more particularly to temperatures above 550° C. They further have a suitable crystallographic structure making it possible to obtain the barrier effect against contaminants, while possessing the required mixed properties of preferentially exclusive conduction of protons and electrons. Furthermore, these compounds are chemically stable under a reducing atmosphere, such as the one that exists between the proton conductor and the negative electrode.

According to one embodiment, the device may further comprise a macroporous support in contact with the negative electrode, the macroporous support being able to diffuse gaseous species.

According to one embodiment, the proton conductor may be a proton-exchange polymer membrane.

The device thus formed is a PEFC fuel cell including the PEMFC type.

According to another embodiment, the proton conductor may be a solid ceramic electrolyte able to diffuse protons.

The device thus formed is a PCFC fuel cell, or an SOFC proton-conductive fuel cell in general terms.

According to one embodiment, the material of the layer able to diffuse protons and electrons is a single-phase ceramic.

In such a material, the perovskite structure of the layer is a single ceramic phase.

According to one embodiment, the material of the layer able to diffuse protons and electrons is a multiphase material.

In such an arrangement of the material, it is possible to find a plurality of ceramic domains forming a composite or ceramic domains and one or more metal domains.

According to one embodiment, material of the layer able to diffuse protons and electrons is a two-phase material chosen from a ceramic-ceramic composite or a ceramic-metal composite.

In such an arrangement of the material, it is possible to find two ceramic domains forming a composite or a single-phase ceramic domain in combination with a metal.

According to one embodiment, the device may also be arranged so as to operate as a hydrogen-oxygen fuel cell, the oxidising species being oxygen and the reducing species being hydrogen.

Functioning as a hydrogen-oxygen fuel cell may use any type of carbonaceous gas comprising a hydrogen source that can be oxidised by the negative electrode, such as for example bioalcohols or methane. The air then constitutes a source of oxygen for the porous positive electrode.

According to one embodiment, the device may also be arranged so as to operate as an ammonia reactor.

Functioning as an ammonia reactor makes it possible also to use nitrogen in order to make it react with the protons on the negative electrode.

According to one embodiment, the device may be arranged also so as to operate as an electrolyser.

Used as an electrolyser, a fuel cell generates the reducing and oxidising species by adding an electrical voltage or an electric current. In the case of a water electrolyser, the species created are hydrogen on the anode and oxygen on the cathode.

According to one embodiment, the device may also be arranged so as to operate as an electroreduction apparatus.

An electroreduction apparatus makes it possible for example to generate fuels of the alcohol or methane type.

The disclosure also relates to a method for manufacturing a proton-conductive electrochemical device as disclosed above. This method comprises:

manufacturing a porous positive electrode able to reduce an oxidising species;

manufacturing a negative electrode able to oxidise a reducing species;

manufacturing a proton conductor, put in contact with the positive electrode and with the negative electrode.

This method further comprises the manufacture of a layer able to diffuse protons and electrons and forming a protective barrier to the contaminants for the proton conductor, said layer being in contact with the proton conductor on the one hand and the negative electrode on the other hand.

Such a method has the advantage of requiring no particular modification to the standard method for manufacturing a proton-conductor electrochemical device. It suffices to provide the interposing of the layer that is the subject matter of the present disclosure between the proton conductor and the negative electrode. The method is therefore easily adaptable to existing production lines.

BRIEF DESCRIPTION OF THE DRAWINGS

The method that is the subject matter of the disclosure will be understood better from a reading of the following description of example embodiments presented illustratively and in no way limitatively, and from an observation of the following drawings, in which.

For reasons of clarity, the dimensions of the various elements shown in these figures are not necessarily in proportion to their actual dimensions. In the figures, identical references correspond to identical elements.

DETAILED DESCRIPTION

The present disclosure proposes to integrate a layer having mixed electron-conduction and proton-conduction properties in a proton-conduction electrochemical device. The disclosure in this way makes it possible to carry out selective filtering allowing to preferentially pass only the charge carriers (protons and electrons) that are involved in the functioning of the electrochemical device, but block the passage of any other species liable to constitute a contaminant detrimental to the proton conductor. The disclosure thus protects the proton conductor of an electrochemical device, and more particularly its proton conductor, against contaminants, without interfering with the functioning of the device. The layer integrated in the proton-conduction electrochemical device thus acts as a proton and electron filter, and affords protection of the proton-conductive electrolyte against the residues of the internal reforming reaction issuing from hydrogen-source gaseous fuels (biogas for example) of an electrochemical device.

FIGS. 1 to 4 illustrate schematically the functioning of electrochemical devices able to benefit from the teachings of the present disclosure. Other types of electrochemical device, in particular fuel cells functioning in accordance with other chemical reactions, may also benefit from the addition, between a proton-conductive electrolyte and a negative electrode, of a mixed layer able to conduct protons and electrons, while blocking contaminants.

Figure 1:
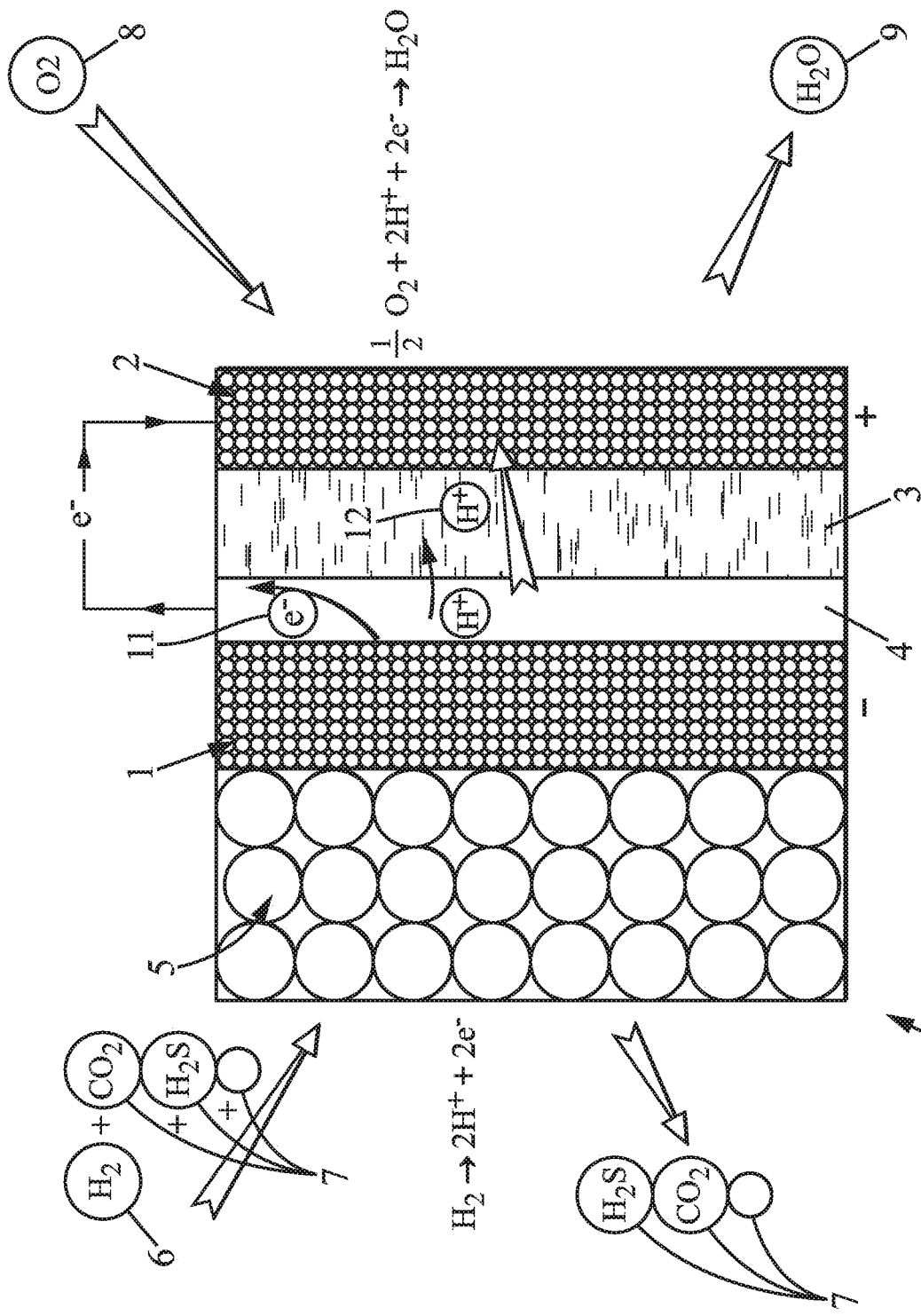
FIG. 1 is a schematic representation of a fuel cell according to an embodiment.

As illustrated in FIG. 1, an example of a proton-conductive electrochemical device according to the disclosure may be in the form of a hydrogen-oxygen fuel cell 10.

Such a fuel cell may be a PEMFC cell with a proton conductor 3 in the form of a hydrated organic membrane. It may also be a cell of the SOFC type or more particularly of the PCFC type, in which the proton-conductive electrolyte 3 is in the form of a solid material, for example made from ceramic.

As illustrated in FIG. 1, the fuel cell comprises a negative electrode 1 forming an anode. This anode is shown as being a porous structure. The negative electrode may in particular be a mesoporous hydrogen electrode layer manufactured from a material of the ceramic-metal (cermet) alloy type comprising for example nickel and an electrolyte material. A negative electrode of the cermet type typically has a thickness of around 50 to 100 µm. The anode is the seat of the reaction of dissociation of the hydrogen into protons and electrons, by oxidation. This cermet negative electrode 1 has mixed conduction properties and leads both to electrons and to protons. The negative electrode 1 may also be the seat of a recombination of electrons and protons in order to form hydrogen when the fuel cell is used as an electrolyser. It may also be the seat of the internal reforming of the incoming fuel.

The negative electrode 1 is in contact with a layer forming a macroporous support 5, allowing diffusion of the fuel and gases arriving to the anode and species (residues of the oxidation reaction, gas, surplus fuel, blocked contaminants) arriving from the anode. The macroporous support 5 may typically consist of a metal such as nickel or cermet, and have a thickness generally lying between 100 µm and 2000 µm.

The fuel cell in FIG. 1 further comprises a porous positive electrode 2 forming a cathode. This positive electrode 2 may be in the form of a mixed-conduction layer, able to conduct both electrons $e^-$ and protons $H^+$. As indicated in FIG. 1, the positive electrode of a fuel cell is the seat of a reaction of reduction of oxygen 8 from air. The oxygen $O_2$ recombines with the protons 12 and the electrons 11 in order to form water 9.

The space between the anode and the cathode is occupied by a proton-conductive electrolyte 3. As indicated above, this conductor may be either a hydrated organic membrane in the case of PEMFC cells or a ceramic solid oxide in the case of PCFCs. The proton-conductive electrolyte 3 is generally composed of a dense layer, providing exclusive conduction for protons, but not conducting the electrons 11. The electrons 11 may be supplied and recovered by an external electrical circuit providing an indirect electrical connection between the anode and the cathode. The thickness of the proton conductor 3 is typically between 5 µm and 50 µm.

One of the contributions of the present disclosure to the improvement of the performances of the proton-conductive electrochemical devices lies in the use of the layer 4 interposed between the proton conductor 3 and the negative electrode 1. This layer 4 is typically a mixed layer conducting both protons 12 and electrons 11. For simplicity, reference is made to these multiple properties by the term MIEC-H$^+$, standing for "mixed ionic and electronic conductor" according to English terminology.

This layer 4 is advantageously placed between the proton-conducting electrode 3 and the negative electrode 1 in order to protect the proton-conductive electrolyte 3 from the fuel supplying the fuel cell 10.

FIG. 1 illustrates schematically the supply of a fuel from the outside in the direction of the negative electrode 1. The fuel shown in FIG. 1 comprises a source of hydrogen 6, denoted Hz, as well as contaminants 7 such as carbon dioxide $CO_2$, hydrogen sulphide $H_2S$ or other pollutants such as carbon monoxide CO for example. Typically, the hydrogen sources that can be used to supply a fuel cell include biogases, bioalcohols and methane. These fuels generally comprise, apart from the hydrogen source, a mixture of reformate gas for example with compounds such as CO, $CO_2$ and $N_2$ and all kinds of carbon derivatives, which constitute pollution that is irreversibly detrimental to the proton-conductive electrolyte 3. The elements other than hydrogen may all constitute a source of contaminant 7 liable to damage the proton-conductive electrolyte 3 of the fuel cell 10 irreversibly. However, the presence of the layer 4 makes it possible to form a protective barrier that prevents these contaminants from reaching the proton-conductive electrolyte 3, but does not prevent the fuel of any kind from reaching the negative electrode 1 that is the seat of the oxidation reaction, generating protons and electrons.

The layer 4 advantageously has sufficient density to fulfil its role of barrier to the contaminants 7 while providing optimum conduction for the electrons 11 and protons 12. The barrier effect against contaminants is improved when the density of the layer 4 increases. Furthermore, the properties of diffusion kinetics of the electrons and protons of the layer 4 increase when the density of the layer 4 increases. For this reason, the density of the layer 4 may advantageously be greater than 90% by volume, in order to simultaneously ensure optimum functioning for these two functions. Such a density corresponds to a porosity of less than 10% by volume of the layer 4.

Similarly, the diffusion kinetics of the protons and electrons of the layer 4 decrease when the thickness of the layer 4 increases, while the barrier effect against contaminants of this same layer 4 increases when the thickness of the layer 4 increases. Optimum performances for the two functions sought for the layer 4 are achieved when the layer 4 has as thickness of between 1 µm and 10 µm.

Furthermore, the layer 4 may be produced from a material having a crystallographic structure suited to electron and proton conduction, while preventing the other species from passing. In this way, the layer 4 has a character of selectivity preferentially to electrons 11 and protons 12. Among the compounds having this property, there are the compounds derived from the perovskite family, which may be represented by a material of the type $ABO_3$, in which A is an element chosen from group II of the periodic table, and B is an element chosen from cerium or group IVB of the periodic table.

More particularly, perovskites in which A is chosen from barium Ba or strontium Sr, and B is chosen from zirconium Zr or cerium Ce.

Alternatively, it is also possible to produce the layer 4 in a material of the type $ABB'O_3$ in which A is an element chosen from group II of the periodic table, B is an element chosen from cerium or group IVB of the periodic table, and B' is an element chosen from lanthanides or group VIIIB of the periodic table.

More particularly, materials of the type $ABB'O_3$, in which A is chosen from barium Ba or strontium Sr, B is chosen from zirconium Zr or cerium Ce, and B' is chosen from praseodymium Pr, cobalt Co or neodymium Nd.

The two categories of materials presented above have the additional advantage of being resistant to temperatures typically encountered in fuel cells of the PCFC type, lying between 400° C. and 700° C., and more particularly temperatures above 550° C., in a reducing atmosphere and steam. These compounds thus offer great mechanical and physicochemical stability to the proton-conductive electrochemical device that is equipped therewith.

It should be noted that the layer 4 may be used in all types of PEFC device, that is to say those comprising polymer electrolytes, generally used for applications below 250° C., those comprising ceramic materials, typically used for applications above 400° C. and more particularly above 550° C., and those comprising different materials for intermediate temperatures lying between 250° and 400° C. Among the proton-conductive electrolytes used at intermediate temperatures there is for example $CsH_2PO_4$.

The layer 4 being interposed between the proton-conductive electrolyte 3 and the negative electrode 1, it is not self-supporting and may have a fine thickness suited to the required properties of barrier effect and mixed conduction. In this, the layer 4 of MIEC-H$^+$ is not comparable to a thick membrane of materials derived from the perovskite family.

It should be noted that the layer 4 may consist of a single type of single-phase material (then forming a single ceramic phase), or a mixture of a plurality of different compounds, two-phase or multiphase, which may for example be in the form of ceramic-ceramic composites or ceramic-metal composites.

As illustrated in FIG. 1, the electrical circuit providing a connection between the anode and the cathode connects the porous positive electrode 2 to the layer 4. However, the electrical circuit may also connect the anode directly to the cathode.

The consumption reaction of the reagents consisting of oxygen and hydrogen, as shown in FIG. 1, may also be reversed by the addition of energy and heat in order to produce these same fuels from water. In this case, an electrochemical device similar to a fuel cell functions as an electrolyser 20, as shown in FIG. 2.

Figure 2:
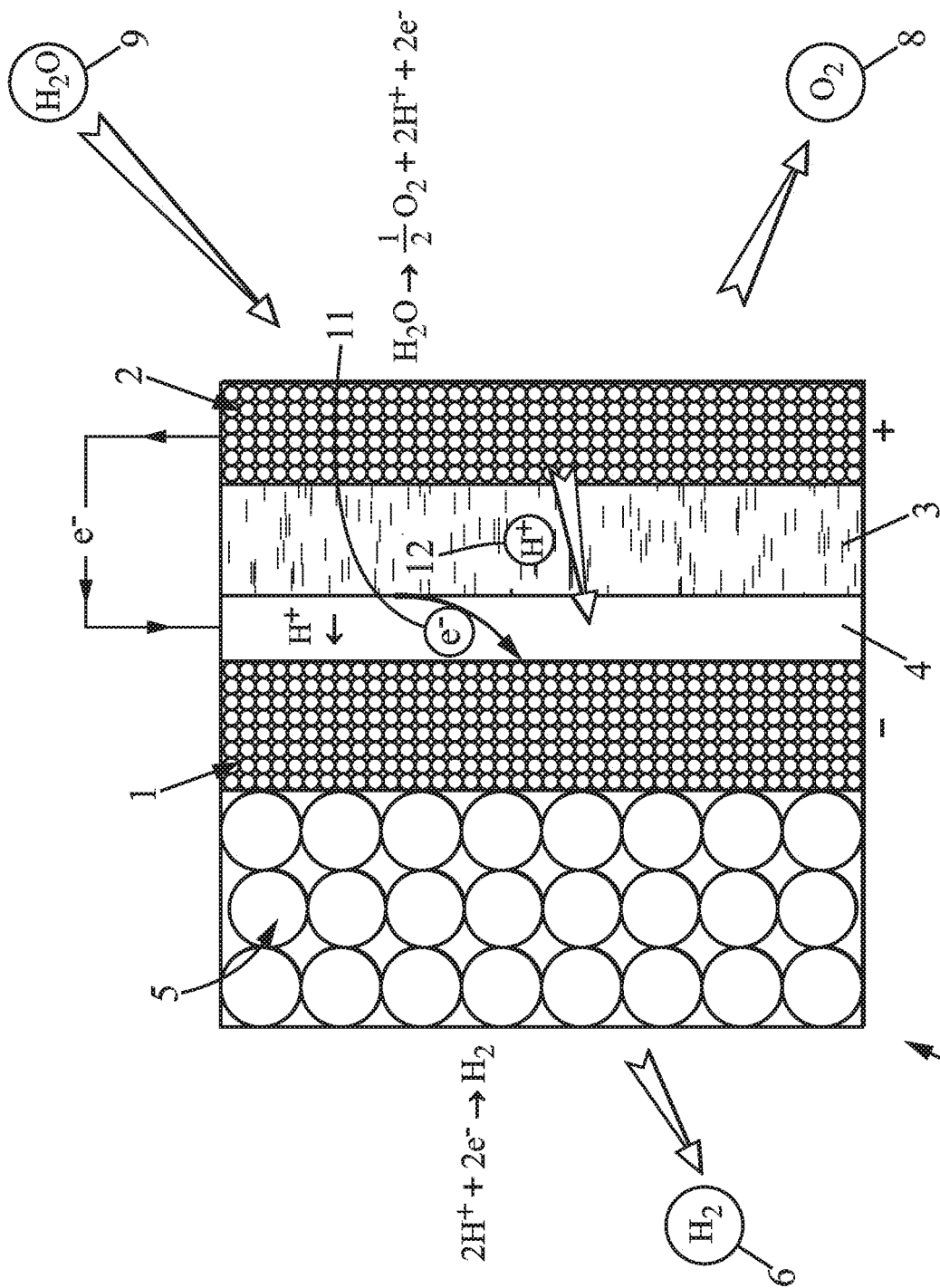
FIG. 2 is a schematic representation of an electrolyser according to an embodiment.

When the electrochemical device of FIG. 2 is activated, the water 9 arriving on the porous positive electrode 2 in the vapour state is hydrolysed in order to produce protons 12, electrons 11 and oxygen 8. Protons 12 and electrons 11 arrive on the negative electrode 1 in order to react and form hydrogen 6. The electrolyser 20 in FIG. 2 also protects the proton-conductive electrolyte 3 from any contaminant that may pass through the macroporous support 5 and the negative electrode 1.

Figure 3:
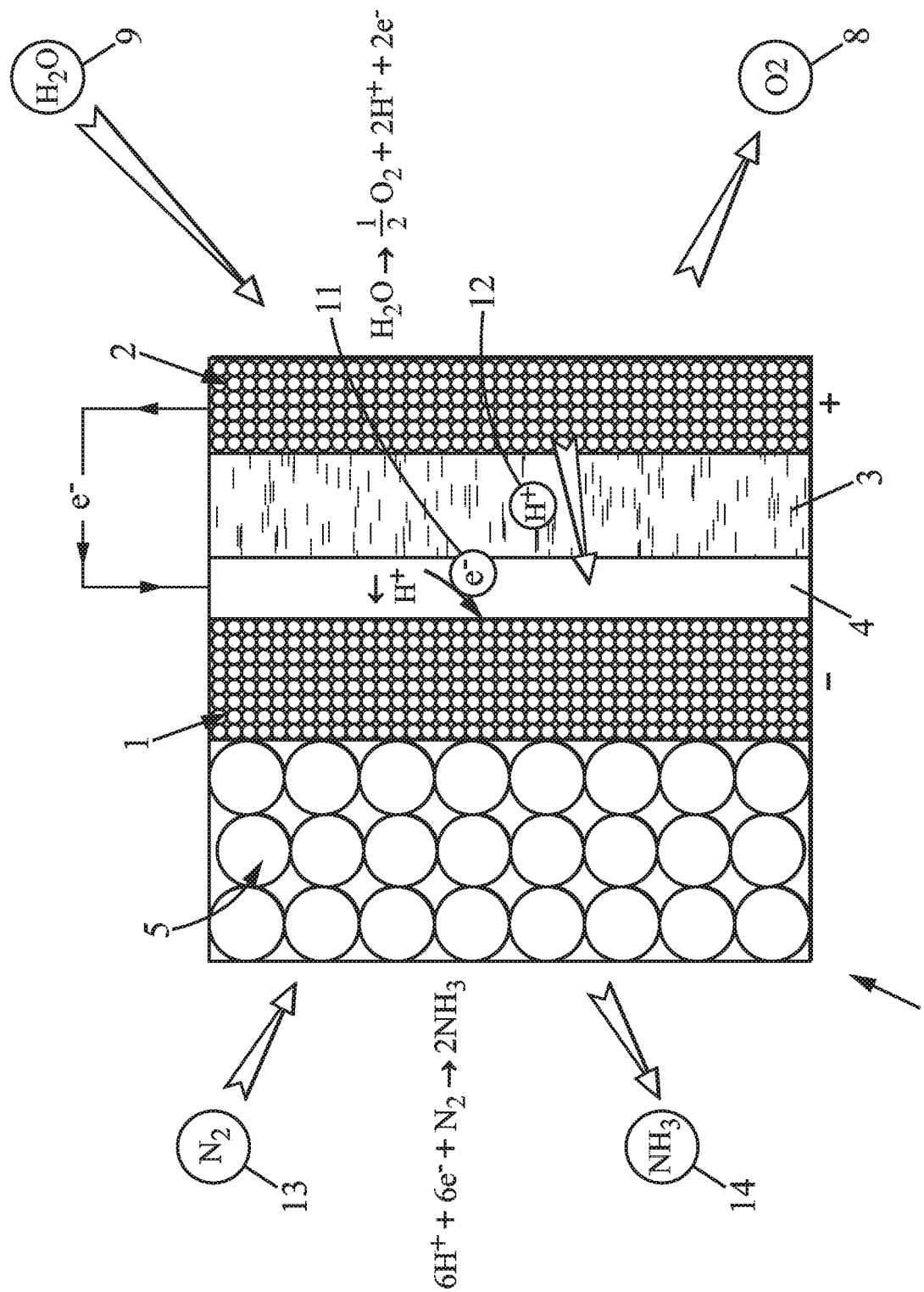
FIG. 3 is a schematic representation of an ammonia reactor according to an embodiment.

Another example of implementation of the present disclosure is shown in FIG. 3. In this figure, a proton-conductive electrochemical device arranged in the form of an ammonia reactor 30 is shown. This synthesis of ammonia is carried out by supplying the positive electrode 2 with water 9 in order to produce protons 12 and electrons 11 as well as oxygen 8. The protons and electrons next react on the negative electrode 1 in combination with the incoming nitrogen 13 in order to form ammonia 14. The ammonia reactor 30 protects the proton-conductive electrolyte 3 from the ammonia 14, which cannot pass the layer 4 of MIEC-H$^+$.

Figure 4:
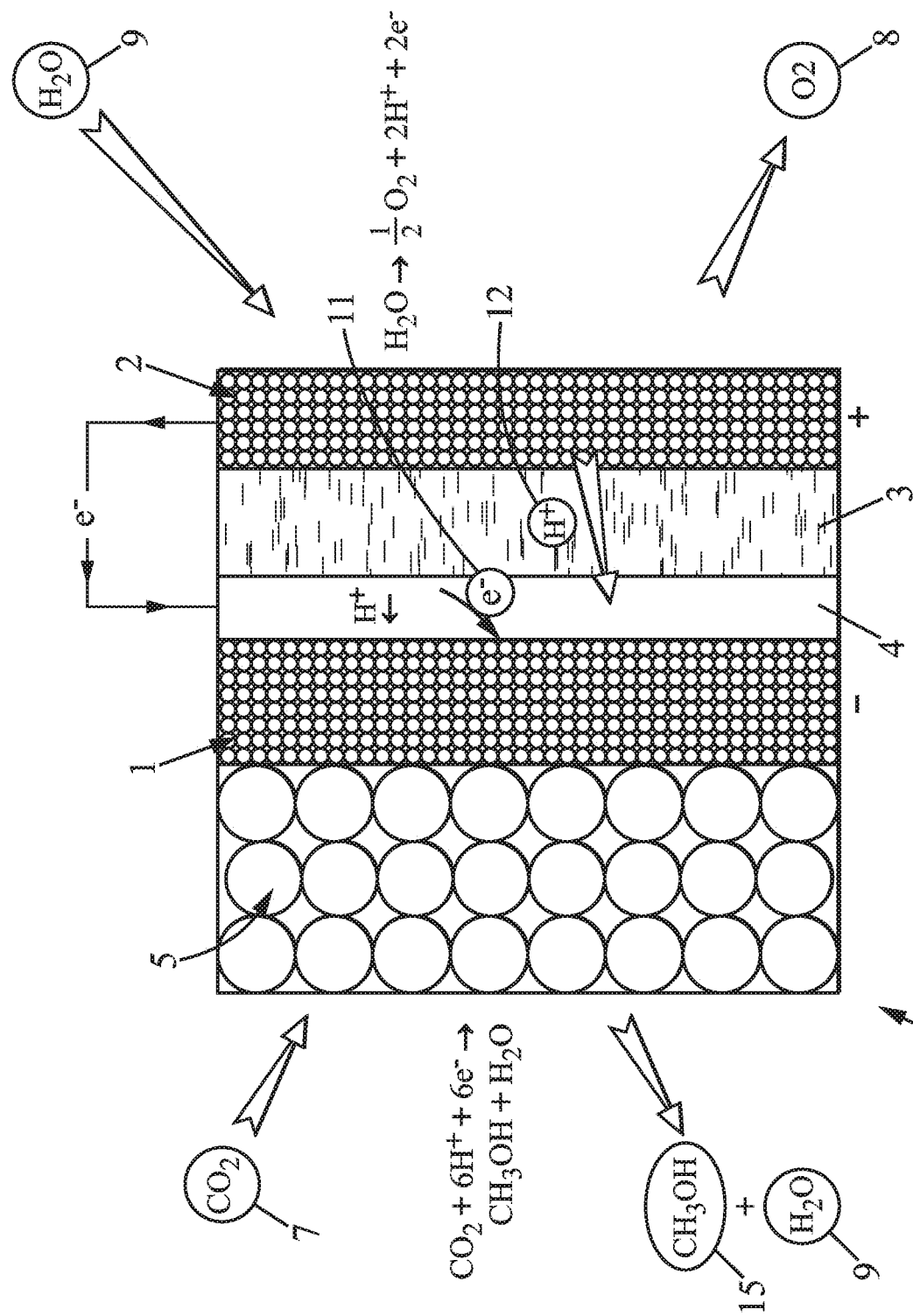
FIG. 4 is a schematic representation of an electroreduction apparatus according to an embodiment.

Another example of a proton-conductive electrochemical device that can benefit from the present disclosure is shown in FIG. 4. In this figure, an electroreduction apparatus 40 is used to produce in particular methanol $CH_3OH$. In this configuration, the positive electrode 2 produces oxygen 8, electrons 11 and protons 12 from water 9. The incoming carbon dioxide reacts with the protons 12 and the electrons 11 in order to produce in particular water 9 and methanol 15 at the negative electrode 1. The incoming $CO_2$ on the negative electrode 1 does not damage the proton-conductive electrolyte 3 because of the presence of the layer 4 between the proton-conductive electrolyte 3 and the negative electrode 1.

These various examples of electrochemical devices using a proton-conductive electrolyte are provided by way of illustration. Other variants of devices, involving other reducing and oxidising species as a fuel, may also benefit from the advantages conferred by the addition of a layer 4 as described above between a negative electrode 1 and a proton-conductive electrolyte 3.

The general structure of the proton-conductive electrochemical devices presented above suggests a structure in planar layers. Although such an architecture can be envisaged, a tubular architecture may be preferred to it, in which the central part serves as a place for receiving fuels intended for the positive electrode 2 while the external surface is in contact with the fuel or fuels supplying the negative electrode 1.

The disclosure also proposes a method for manufacturing a proton-conductive electrochemical device such as for example those presented above. The method comprises the manufacture of all the constituents forming the proton-conductive electrochemical device, with furthermore the manufacture of a layer 4 of the MIEC-H$^+$ type, and the putting of this layer in contact with the negative electrode 1 on the one hand and the proton-conductive electrolyte 3 on the other hand. The manufacture of the layer 4 takes place during the manufacture of the other constituents of the proton-conductive electrochemical device. Through this great flexibility, adding a layer 4 to such a proton-conductive electrochemical device represents only minimal investment during manufacture thereof.

The invention claimed is:

1. A proton-conductive electrochemical device, comprising:
  a positive electrode able to reduce an oxidizing species;
  a negative electrode able to oxidize a reducing species;
  a proton-conductive electrolyte, occupying a space between the positive electrode and the negative electrode and allowing the conduction of protons between the positive electrode and the negative electrode;
  the electrochemical device further comprising a layer able to diffuse protons and electrons and forming a protective barrier against contaminants for the proton-conductive electrolyte, said layer being in contact with both the proton-conductive electrolyte and the negative electrode, the layer able to diffuse protons and electrons comprising a material of the type ABB'O$_3$ or a material of the type ABO$_3$, wherein A is an element chosen from group II of the periodic table, B is an element chosen from cerium and group IVB of the periodic table, B' is an element chosen from lanthanides or group VIIIB of the periodic table, and
  wherein the layer able to diffuse protons and electrons has a porosity of less than 10% by volume.

2. The device according to claim 1, wherein the layer able to diffuse protons and electrons has a thickness of between 1 μm and 10 μm.

3. The device according to claim 1, further comprising a macroporous support in contact with the negative electrode, the macroporous support being able to diffuse gaseous species.

4. The device according to claim 1, wherein the proton conductor is a proton-exchange polymer membrane.

5. The device according to claim 1, wherein the proton conductor is a solid electrolyte able to diffuse protons.

6. The device according to claim 1, wherein the material of the layer able to diffuse protons and electrons is a single-phase ceramic.

7. The device according to claim 1, wherein material of the layer able to diffuse protons and electrons is a multiphase material.

8. The device according to claim 1, wherein the material of the layer able to diffuse protons and electrons is a two-phase material chosen from a ceramic-ceramic composite or a ceramic-metal composite.

9. The device according to claim 1, wherein the electrochemical device is as a fuel cell, the oxidizing species being oxygen and the reducing species being hydrogen.

10. The device according to claim 1, wherein the electrochemical device is an ammonia reactor.

11. The device according to claim 1, wherein the electrochemical device is an electrolyser.

12. The device according to claim 1, wherein the electrochemical device is an electroreduction apparatus.

13. A method for manufacturing a proton-conductive electrochemical device, comprising:
   manufacturing a positive electrode able to reduce an oxidizing species;
   manufacturing a negative electrode able to oxidize a reducing species;
   manufacturing a proton-conductive electrolyte, occupying a space between the positive electrode and a negative electrode and allowing the conduction of protons between the positive electrode and the negative electrode;
the method further comprising:
   manufacturing a layer able to diffuse protons and electrons and forming a protective barrier against contaminants for the proton-conductive electrolyte, said layer being in contact with both the proton-conductive electrolyte and the negative electrode, the layer able to diffuse protons and electrons comprising a material of the type $ABB'O_3$ or a material of the type $ABO_3$, wherein A is an element chosen from group II of the periodic table, B is an element chosen from cerium and group IVB of the periodic table, B' is an element chosen from lanthanides or group VIIIB of the periodic table, and
wherein the layer able to diffuse protons and electrons has a porosity of less than 10% by volume.

* * * * *